(12) United States Patent
Ohta

(10) Patent No.: US 11,842,182 B2
(45) Date of Patent: Dec. 12, 2023

(54) METHOD OF DETERMINING PROCESSING BLOCK TO BE OPTIMIZED AND INFORMATION PROCESSING APPARATUS

(71) Applicant: FUJITSU LIMITED, Kawasaki (JP)

(72) Inventor: Eiji Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 17/523,053

(22) Filed: Nov. 10, 2021

(65) Prior Publication Data

US 2022/0253299 A1 Aug. 11, 2022

(30) Foreign Application Priority Data

Feb. 8, 2021 (JP) ................................. 2021-018328

(51) Int. Cl.

| | | |
|---|---|---|
| *G06F 8/65* | (2018.01) | |
| *G06F 8/71* | (2018.01) | |
| *G06F 11/30* | (2006.01) | |
| *H04L 67/00* | (2022.01) | |
| *G06F 8/41* | (2018.01) | |

(52) U.S. Cl.
CPC ............... *G06F 8/65* (2013.01); *G06F 8/443* (2013.01); *G06F 8/71* (2013.01); *G06F 11/3086* (2013.01); *H04L 67/34* (2013.01)

(58) Field of Classification Search
CPC ... G06F 8/65; G06F 8/443; G06F 8/71; G06F 11/3086; H04L 67/34
USPC ........................................................ 717/168
See application file for complete search history.

(56) References Cited

U.S. PATENT DOCUMENTS

| 7,730,469 B1 * | 6/2010 | Boucher .................. G06F 8/443 |
| | | 717/151 |
| 2022/0035602 A1 * | 2/2022 | Elango ...................... G06F 8/75 |

FOREIGN PATENT DOCUMENTS

| JP | 06-175843 A | 6/1994 |
| JP | 09-016436 A | 1/1997 |
| JP | 2003-044289 A | 2/2003 |

OTHER PUBLICATIONS

Schulte et al, "Post-compiler Software Optimization for Reducing Energy", 2014, [Online], pp. 639-651, [Retrieved from internet on Mar. 9, 2023], <https://dl.acm.org/doi/pdf/10.1145/2654822.2541980> (Year: 2014).*

(Continued)

*Primary Examiner* — S. Sough
*Assistant Examiner* — Zengpu Wei
(74) *Attorney, Agent, or Firm* — ArentFox Schiff LLP

(57) ABSTRACT

A non-transitory computer-readable recording medium stores a program for causing a computer to execute a process, the process includes extracting an optimization method and an optimization non-applicable condition indicating a reason why the optimization method is not applicable, from an optimization report created at a time of compiling software, determining an index value of optimization application easiness for each of a plurality of processing blocks included in the software, based on the optimization method and the optimization non-applicable condition, and determining an optimization target processing block to be optimized among the plurality of processing blocks included in the software, based on the index value.

12 Claims, 23 Drawing Sheets

(56) References Cited

OTHER PUBLICATIONS

Rahman et al, "Automated Empirical Tuning of Scientific Codes For Performance and Power Consumption", 2011, [Online], pp. 107-116, [Retrieved from internet on Jul. 26, 2023], <chrome-extension://efaidnbmnnnibpcajpcglclefindmkaj/https://dl.acm.org/doi/pdf/10.1145/1944862.1944880> (Year: 2011).*

* cited by examiner

FIG. 4

| COST | COST RATIO (%) | EXECUTION TIME (S) | MODULE |
|---|---|---|---|
| 6085 | 20.6 | 608.4895 | func_01 |
| 3521 | 11.9 | 352.0938 | func_02 |
| 2334 | 7.9 | 233.3966 | func_03 |
| 2035 | 6.9 | 203.4967 | func_04 |
| 1577 | 5.3 | 157.6967 | func_05 |
| 1468 | 5.0 | 146.7976 | func_06 |
| 1084 | 3.7 | 108.3983 | func_07 |
| 1006 | 3.4 | 100.5985 | func_08 |
| 935 | 3.2 | 93.4985 | func_09 |
| 883 | 3.0 | 88.2986 | qvan2_ |
| 801 | 2.7 | 80.0981 | func_11_ |
| 630 | 2.1 | 62.9983 | func_12 |
| 617 | 2.1 | 61.6994 | func_13 |
| 425 | 1.4 | 42.4991 | func_14 |
| 363 | 1.2 | 36.2991 | func_15 |

NOT SELECTED AS TUNING TARGET BECAUSE MODULE IS WITHIN MATHEMATICAL LIBRARY CODE (FFT, MPI, OR THE LIKE) AND IS DIFFICULT TO BE TUNED ON OSS SIDE

SELECT HIGH-COST MODULE IN OSS CODE AS TUNING TARGET

FIG. 5

| OPTIMIZATION TYPE | OPTIMIZATION INDEX (FOR EACH OPTIMIZATION NON-APPLICABLE CONDITION) | | | | | | CONTENT OF OPTIMIZATION |
|---|---|---|---|---|---|---|---|
| | Nc_1 | Nc_2 | Nc_3 | Nc_4 | Nc_5 | Nc_6 | |
| Opt-1 : REMOVAL OF COMMON EXPRESSION | 0 | 0 | 0 | 0 | 0 | 0 | INTEGRATE PLURALITY OF EXPRESSIONS TO BRING ABOUT EQUAL CALCULATION RESULT |
| Opt-2 : MOVEMENT OF INVARIANT | 0 | 0 | 0 | 0 | 0 | 0 | MOVE INVARIANT IN LOOP TO OUTSIDE OF LOOP |
| Opt-3 : OPERATOR STRENGTH REDUCTION | 0 | 0 | 0 | 0 | 0 | 0 | CONVERT TO OPERATOR WHOSE EXECUTION TIME IS PRESUMABLY SMALL |
| Opt-4 : LOOP UNROLLING | 0 | 0 | 0 | 0 | 0 | 0 | EXPAND EXECUTION STATEMENTS IN LOOP |
| Opt-5 : LOOP BLOCKING | 0 | 0 | 0 | 0 | 0 | 0 | IMPROVE LOCALITY OF MEMORY ACCESS BY MULTIPLE-LOOP |
| Opt-6 : SOFTWARE PIPELINE | 0.5 | 0.5 | 0.8 | 0.5 | 0.5 | 0.4 | EXECUTE EXECUTION STATEMENTS IN LOOP IN PARALLEL |
| Opt-7 : SIMD IMPLEMENTATION | 0.5 | 0.5 | 0.8 | 0.5 | 0.5 | 0.4 | CONVERT TO SIMD INSTRUCTION |
| Opt-8 : LOOP UNSWITCHING | 0 | 0 | 0 | 0 | 0 | 0 | MOVE INVARIANT IF-STATEMENT IN LOOP TO OUTSIDE OF LOOP |
| Opt-9 : LOOP DIVISION | 0 | 0 | 0 | 0 | 0 | 0 | DIVIDE LOOP INTO PLURALITY OF SMALL LOOPS |

FIG. 6

| NON-APPLICABLE CONDITION | CONTENT OF OPTIMIZATION NON-APPLICABLE CONDITION |
|---|---|
| Nc_1 | FUNCTION CALL |
| Nc_2 | REGISTER SHORTAGE |
| Nc_3 | BRANCH (PRESENCE OF IF-STATEMENT) |
| Nc_4 | COMPLICATED STRUCTURE OF EXECUTION STATEMENTS IN LOOP |
| Nc_5 | EXECUTION STATEMENT UNABLE TO IMPLEMENT SIMD IS INCLUDED IN LOOP |
| Nc_6 | THERE IS POSSIBILITY THAT RESULT DIFFERS FROM SERIAL EXECUTION RESULT DUE TO DATA DEPENDENCY, CHANGE IN SUBSTITUTION REFERENCE ORDER, OR THE LIKE |

```
<<< Loop-information Start >>>
  <<< [OPTIMIZATION]
  <<< PREFETCH(HARD) Expected by
compiler :
  <<< qmod, ylmko, qg
<<< Loop-information End >>>
```

FIG. 10

```
Diagnostic messages: program name(qvan2)
  jwd8220o-i "qvan2_tmp.f90", line 21: Optimizations is performed in this program unit with
possibility of side effects. See informational messages below to determine which such
optimizations have been performed.
  jwd6003s-i "qvan2_tmp.f90", line 94: SIMD conversion is applied to array description.
  jwd8204o-i "qvan2_tmp.f90", line 94: This loop is software pipelined.
  jwd8205o-i "qvan2_tmp.f90", line 94: The software-pipelined loop is chosen at run time when
the iteration count is greater than or equal to 48.
  jwd6229s-i "qvan2_tmp.f90", line 139: SIMD conversion is not applied to DO loop: there are
IF statements in the loop.
  jwd8670o-i "qvan2_tmp.f90", line 139: This loop cannot be software pipelined because the
loop contains a branch instruction.
  jwd6202s-i "qvan2_tmp.f90", line 143: SIMD conversion cannot be applied to DO loop: data
dependency of variable 'qm1' may cause different results from serial execution for loop.
  jwd8209o-i "qvan2_tmp.f90", line 154: Evaluation order of polynomial expression is changed
according to commutative law of addition and multiplication.
  jwd8209o-i "qvan2_tmp.f90", line 155: Evaluation order of polynomial expression is changed
according to commutative law of addition and multiplication.
  jwd8209o-i "qvan2_tmp.f90", line 156: Evaluation order of polynomial expression is changed
according to commutative law of addition and multiplication.
  jwd6202s-i "qvan2_tmp.f90", line 156: SIMD conversion cannot be applied to DO loop: data
dependency of variable 'work' may cause different results from serial execution for loop.
  jwd8209o-i "qvan2_tmp.f90", line 162: Evaluation order of polynomial expression is changed
according to commutative law of addition and multiplication.
```

| OPTIMIZATION TYPE | OPTIMIZATION INDEX (FOR EACH NON-APPLICABLE CONDITION) | | | | | | CONTENT OF OPTIMIZATION |
|---|---|---|---|---|---|---|---|
| | Nc_1 | Nc_2 | Nc_3 | Nc_4 | Nc_5 | Nc_6 | |
| Opt-1 : REMOVAL OF COMMON EXPRESSION | 0 | 0 | 0 | 0 | 0 | 0 | INTEGRATE PLURALITY OF EXPRESSIONS TO BRING ABOUT EQUAL CALCULATION RESULT |
| Opt-2 : LOOP INVARIANT CODE MOTION | 0 | 0 | 0 | 0 | 0 | 0 | MOVE INVARIANT IN LOOP TO OUTSIDE OF LOOP |
| Opt-3 : OPERATOR STRENGTH REDUCTION | 0 | 0 | 0 | 0 | 0 | 0 | CONVERT TO OPERATOR WHOSE EXECUTION TIME IS PRESUMABLY SMALL |
| Opt-4 : LOOP UNROLLING | 0 | 0 | 0 | 0 | 0 | 0 | EXPAND EXECUTION STATEMENTS IN LOOP |
| Opt-5 : LOOP BLOCKING | 0 | 0 | 0 | 0 | 0 | 0 | IMPROVE LOCALITY OF MEMORY ACCESS BY MULTIPLE-LOOP |
| Opt-6 : SOFTWARE PIPELINING | 0 | 0 | 0.8 | 0.5 | 0.5 | 0.4 | |
| Opt-7 : SIMD IMPLEMENTATION | 0 | 0 | 0.8 | 0.5 | 0.5 | 0.4 | |
| Opt-8 : LOOP UNSWITCHING | 0 | 0 | 0 | 0 | 0 | 0 | MOVE INVARIANT IF-STATEMENT IN LOOP TO OUTSIDE OF LOOP |
| Opt-9 : LOOP DIVISION | 0 | 0 | 0 | 0 | 0 | 0 | DIVIDE LOOP INTO PLURALITY OF SMALL LOOPS | qvan2.1 HAVING BEEN APPLIED WITH OPTIMIZATION → OPTIMIZATION INDICES: ALL 0

OPTIMIZATION TYPE AND NON-APPLICABLE CONDITION FOR qvan2.2

OPTIMIZATION TYPE AND NON-APPLICABLE CONDITION FOR qvan2.3

| PROCESSING BLOCK | OPTIMIZATION INDEX (FOR EACH OPTIMIZATION TYPE) | | | | | | | | |
|---|---|---|---|---|---|---|---|---|---|
| | Opt_1 | Opt_2 | Opt_3 | Opt_4 | Opt_5 | Opt_6 | Opt_7 | Opt_8 | Opt_9 |
| qvan2.1 | 0 | 0 | 0 | 0 | 0 | 0 | 0 | 0 | 0 |
| qvan2.2 | 0 | 0 | 0 | 0 | 0 | 0.8 | 0.8 | 0 | 0 |
| qvan2.3 | 0 | 0 | 0 | 0 | 0 | 0.4 | 0.4 | 0 | 0 |

FIG. 15

Loops profile

*********************************************************

Application - loops

*********************************************************

| Cost | % | Operation (s) | Barrier | % | Nest | Kind | Exec | Start | End | Application |
|---|---|---|---|---|---|---|---|---|---|---|
| 29507 | 100.0000 | 2950.6489 | | | | | | | | |
| 2321 | 7.8659 | 232.0967 | -- | -- | 1 | FOR | SERIAL | 47 | 281 | func_001 |
| 2025 | 6.8628 | 202.4967 | -- | -- | 1 | FOR | SERIAL | 45 | 271 | func_002 |
| 1464 | 4.9615 | 146.3976 | -- | -- | 1 | FOR | SERIAL | 88 | 629 | func_003 |
| 1006 | 3.4094 | 100.5985 | -- | -- | 1 | FOR | SERIAL | 45 | 130 | func_004 |
| 931 | 3.1552 | 93.0985 | -- | -- | -- | ARRAY | SERIAL | 188 | 188 | func_005 |
| 826 | 2.7993 | 82.5987 | -- | -- | 2 | DO | SERIAL | 155 | 189 | qvan2 |
| 651 | 2.2063 | 65.0992 | -- | -- | 3 | DO | SERIAL | 175 | 179 | func_006 |
| ... | | | | | | | | | | |
| 71 | 0.2406 | 7.0999 | -- | -- | 1 | FOR | SERIAL | 63 | 149 | func_0023 |
| 68 | 0.2305 | 6.7998 | -- | -- | 1 | FOR | SERIAL | 51 | 55 | func_0024 |
| 65 | 0.2203 | 6.4999 | -- | -- | 3 | DO | SERIAL | 125 | 138 | func_0025 |
| 64 | 0.2169 | 6.4000 | -- | -- | 5 | DO | SERIAL | 173 | 175 | func_0026 |
| 60 | 0.2033 | 5.9999 | -- | -- | 1 | DO | SERIAL | 118 | 120 | func_0027 |
| 57 | 0.1932 | 5.6999 | -- | -- | 1 | DO | SERIAL | 69 | 142 | func_0028 |
| 56 | 0.1898 | 5.5998 | -- | -- | -- | ARRAY | SERIAL | 110 | 110 | qvan2 |
| ... | | | | | | | | | | |

P01 → COST OF PROCESSING BLOCK qvan2.2

P02 → COST OF PROCESSING BLOCK qvan2.3

FIG. 16

| | | | | | | |
|---|---|---|---|---|---|---|
| 1 | 0.0034 | 0.1000 | ... | 4 | DO SERIAL | 147 | 155 func_008 |
| 1 | 0.0034 | 0.1000 | ... | 1 | FOR SERIAL | 48 | 155 func_009 |
| 1 | 0.0034 | 0.1000 | ... | 1 | FOR SERIAL | 48 | 266 func_010 |
| 1 | 0.0034 | 0.1000 | ... | -- | ARRAY SERIAL | 1433 | 1433 func_011 |
| 1 | 0.0034 | 0.1000 | ... | 1 | DO SERIAL | 105 | 107 func_012 |
| 1 | 0.0034 | 0.1000 | ... | -- | ARRAY SERIAL | 1210 | 1210 func_013 |
| 1 | 0.0034 | 0.1000 | ... | -- | ARRAY SERIAL | 152 | 152 func_014 |
| 1 | 0.0034 | 0.1000 | ... | 1 | DO SERIAL | 222 | 225 func_015 |
| 1 | 0.0034 | 0.1000 | ... | 1 | DO SERIAL | 769 | 987 func_016 |
| 1 | 0.0034 | 0.1000 | ... | -- | ARRAY SERIAL | 156 | 156 func_017 |
| 1 | 0.0034 | 0.1000 | ... | 4 | DO SERIAL | 73 | 77 func_018 |
| 1 | 0.0034 | 0.1000 | ... | 1 | DO SERIAL | 200 | 207 func_019 |
| 1 | 0.0034 | 0.1000 | ... | 1 | DO SERIAL | 94 | 186 func_020 |
| 1 | 0.0034 | 0.1000 | ... | -- | ARRAY SERIAL | 195 | 195 func_021 |
| 1 | 0.0034 | 0.1000 | ... | -- | ARRAY SERIAL | 306 | 306 func_022 |
| 1 | 0.0034 | 0.1000 | ... | 1 | DO SERIAL | 282 | 462 func_023 |
| 1 | 0.0034 | 0.1000 | ... | 3 | DO SERIAL | 153 | 165 func_024 |
| 1 | 0.0034 | 0.1000 | ... | -- | ARRAY SERIAL | 227 | 227 func_025 |
| 1 | 0.0034 | 0.1000 | ... | 4 | DO SERIAL | 70 | 123 func_026 |
| 1 | 0.0034 | 0.1000 | ... | 2 | DO SERIAL | 234 | 246 func_027 |
| 1 | 0.0034 | 0.1000 | ... | 1 | DO SERIAL | 437 | 448 func_028 |
| 1 | 0.0034 | 0.1000 | ... | 2 | DO SERIAL | 297 | 305 func_029 |
| 1 | 0.0034 | 0.1000 | ... | 2 | DO SERIAL | 805 | 811 func_030 |
| 1 | 0.0034 | 0.1000 | ... | -- | ARRAY SERIAL | 129 | 129 func_031 |
| 1 | 0.0034 | 0.1000 | ... | 5 | DO SERIAL | 146 | 148 func_032 |
| 1 | 0.0034 | 0.1000 | ... | 1 | DO SERIAL | 114 | 192 qvan2 |
| 1 | 0.0034 | 0.1000 | ... | -- | ARRAY SERIAL | 157 | 157 func_033 |

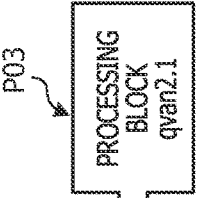

P03 PROCESSING BLOCK qvan2.1

FIG. 17

| PROCESSING BLOCK | COST | COST RATIO (%) | EXECUTION TIME (s) |
|---|---|---|---|
| qvan2.1 | 1 | 0.003 | 0.10 |
| qvan2.2 | 826 | 2.800 | 82.60 |
| qvan2.3 | 56 | 0.190 | 5.60 |

FIG. 18

| OPTIMIZATION TYPE | APPLICATION EFFECT WEIGHT |
|---|---|
| Opt-1 : REMOVAL OF COMMON EXPRESSION | 0.00 |
| Opt-2 : MOVEMENT OF INVARIANT | 0.00 |
| Opt-3 : OPERATOR STRENGTH REDUCTION | 0.00 |
| Opt-4 : LOOP UNROLLING | 0.00 |
| Opt-5 : LOOP BLOCKING | 0.00 |
| Opt-6 : SOFTWARE PIPELINE | 0.45 |
| Opt-7 : SIMD IMPLEMENTATION | 0.55 |
| Opt-8 : LOOP UNSWITCHING | 0.00 |
| Opt-9 : LOOP DIVISION | 0.00 |

FIG. 19

| PROCESSING BLOCK | REPRESENTATIVE COST | OPTIMIZATION EFFECT INDEX | OPTIMIZATION INDEX (FOR EACH OPTIMIZATION TYPE) | | | |
|---|---|---|---|---|---|---|
| | | | Opt-1 | Opt-2 | Opt-3 | Opt-n |
| Blk_07 | 15 | 1.0 | 1.0 | 1.0 | 1.0 | 1.0 |
| Blk_12 | 11 | 0.9 | 1.0 | 0.9 | 1.0 | 1.0 |
| Blk_34 | 10 | 0.7 | 0.8 | 0.8 | 0.8 | 0.5 |
| Blk_42 | 6 | 0.6 | 0.0 | 1.0 | 1.0 | 0.0 |
| ... | ... | ... | ... | ... | ... | ... |

| PROCESSING BLOCK | REPRESENTATIVE COST | OPTIMIZATION EFFECT INDEX | SOURCE CODE CHANGE CONTENT (FOR EACH OPTIMIZATION TYPE) | | | |
|---|---|---|---|---|---|---|
| | | | Opt-1 | Opt-2 | Opt-3 | Opt-n |
| Blk_07 | 15 | 1.0 | CHANGE 1-1 | CHANGE 2-2 | CHANGE 3-4 | CHANGE n-5 |
| Blk_12 | 11 | 0.9 | CHANGE 1-1 | CHANGE 2-2 | CHANGE 3-1 | CHANGE n-1 |
| Blk_34 | 10 | 0.7 | CHANGE 1-2 | CHANGE 2-3 | CHANGE 3-4 | CHANGE n-5 |
| Blk_42 | 6 | 0.6 | CHANGE 1-1 | CHANGE 2-2 | CHANGE 3-2 | CHANGE n-2 |
| ... | ... | ... | ... | ... | ... | ... |

| PROCESSING BLOCK | COST | OPTIMIZATION EFFECT INDEX | SOURCE CODE CHANGE CONTENT |
|---|---|---|---|
| qvan2.2 | 826 | 0.80 | DELETION OF BRANCH (DELETION OF IF-STATEMENT) |
| qvan2.3 | 56 | 0.40 | DISSOLUTION OF DATA DEPENDENCY |
| qvan2.1 | 1 | 0.00 | NONE |

DETECT AS OPTIMIZATION TARGET

| ITEM NUMBER | TUNING CONTENT | ELAPSED TIME [S] | INCREASED SPEED [TIMES] |
|---|---|---|---|
| 0 | ASIS (OPTIMIZATION OPTION: -Kfast) | 1.04 | — |
| 1 | + DELETION OF IF-STATEMENT IN DO LOOP CONFIRM WHETHER INFLUENCE ON CALCULATION RESULT IS SMALL AND THEN CARRY OUT CHANGE | 1.37 | 0.76 |
| 2 | + SIMD IMPLEMENTATION '!OCL SIMD' ADDITION | 0.47 | 2.26 |
| 3 | + SOFTWARE PIPELINE IMPLEMENTATION '!OCL SWP' ADDITION | 0.35 | 3.15 |
| 4 | + PREFETCH ADDITION '!OCL PREFETCH' ADDITION | 0.43 | 2.21 |
| 5 | + PREFETCH ADJUSTMENT (ONLY HARDWARE PREFETCH) '!OCL PREFETCH_SEQUENTIAL(AUTO)' ADDITION | 0.33 | 3.15 |

METHOD OF DETERMINING PROCESSING BLOCK TO BE OPTIMIZED AND INFORMATION PROCESSING APPARATUS

CROSS-REFERENCE TO RELATED APPLICATION

This application is based upon and claims the benefit of priority of the prior Japanese Patent Application No. 2021-18328, filed on Feb. 8, 2021, the entire contents of which are incorporated herein by reference.

FIELD

The embodiment discussed herein is related to a method of determining a processing block to be optimized and an information processing apparatus.

BACKGROUND

In recent years, the use of open source software (OSS) has been attracting attention in the field of high performance computing (HPC) as well, and a reduction in turn around time (TAT) of OSS performance optimization work is desired in the latest HPC environment.

In order to shorten the TAT of performance optimization, it is desired to speed up detection of processing blocks as optimization targets in the OSS. For example, it is desired to detect processing blocks expected to exhibit high optimization effects under given input data and parallel conditions (execution conditions) of the OSS.

For example, based on a profiling report, which is output by a profiler, under a specific execution condition, it is possible to specify a function, code, or the like to serve as an index of high cost, low performance, or the like. A function, code, or the like serving as an index of high cost, low performance, or the like may be referred to as a hot spot.

As the related art, Japanese Laid-open Patent Publication No. 9-16436, Japanese Laid-open Patent Publication No. 6-175843, and Japanese Laid-open Patent Publication No. 2003-44289 are disclosed.

SUMMARY

According to an aspect of the embodiment, a non-transitory computer-readable recording medium stores a program for causing a computer to execute a process, the process includes extracting an optimization method and an optimization non-applicable condition indicating a reason why the optimization method is not applicable, from an optimization report created at a time of compiling software, determining an index value of optimization application easiness for each of a plurality of processing blocks included in the software, based on the optimization method and the optimization non-applicable condition, and determining an optimization target processing block to be optimized among the plurality of processing blocks included in the software, based on the index value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram exemplifying a high-cost processing block ranking in a computer system according to an embodiment;

FIG. 5 is a diagram exemplifying difficulty information for each optimization type in a computer system according to an embodiment;

FIG. 6 is a diagram exemplifying optimization non-applicable conditions in a computer system according to an embodiment;

FIG. 10 is a diagram in which part of a compiler optimization report is extracted and exemplified in a computer system according to an embodiment;

FIG. 11 is a diagram for describing difficulty information for each optimization type in a computer system according to an embodiment;

FIG. 12 is a diagram illustrating an example of optimization index information for each processing block in a computer system according to an embodiment;

FIG. 15 is a diagram in which part of a profiling report is extracted and exemplified in a computer system according to an embodiment;

FIG. 16 is a diagram in which part of a profiling report is extracted and exemplified in a computer system according to an embodiment;

FIG. 17 is a diagram for describing cost totalization information of processing blocks in a computer system according to an embodiment;

FIG. 18 is a diagram exemplifying an application effect weight of each optimization type in a computer system according to an embodiment;

FIG. 19 is a diagram exemplifying optimization target processing block presentation information in a computer system according to an embodiment;

FIG. 20 is a diagram illustrating a modification example of optimization target processing block presentation information in a computer system according to an embodiment;

FIG. 21 is a diagram exemplifying optimization target processing block presentation information in a computer system according to an embodiment;

FIG. 23 is a diagram illustrating an optimization result detected by a management apparatus of a computer system according to an embodiment, along with source code analysis results by an expert using existing methods.

DESCRIPTION OF EMBODIMENT

Figure 1:
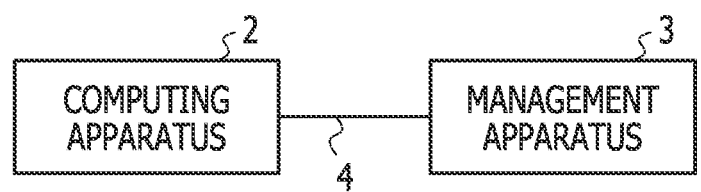
FIG. 1 is a diagram illustrating a configuration of a computer system according to an embodiment.

In such software optimization methods of the related art, analysis of source code by experts having expertise in optimization and hardware architecture is indispensable to the study of optimization effects, causes, and solution methods of the hot spots.

Since the implementation of optimization involves a change of source code, it is requested to grasp processing contents of the source code around the hot spots in order to study solution methods, which may take a significant amount of time.

For each OSS execution condition, it is desired to confirm hot spots and study optimization effects, causes, and solution methods. Because of this, it takes a significant amount of time to detect processing blocks expected to exhibit high optimization effects based on hardware specifications under common execution conditions such as wide-width input data and parallel conditions.

Hereinafter, an embodiment will be described with reference to the drawings. However, the following embodiment is merely an example and does not intend to exclude application of various modification examples and techniques that are not explicitly described in the embodiment. For example, the present embodiment may be variously modified and implemented without departing from the spirit of the embodiment. Each drawing is not intended to indicate that only constituent elements illustrated in the drawing are provided; each drawing indicates that other functions and the like may be included.

(A) Configuration

FIG. 1 is a diagram illustrating a configuration of a computer system 1 according to the embodiment.

As illustrated in FIG. 1, the computer system 1 includes a computing apparatus 2 and a management apparatus 3. The computing apparatus 2 and the management apparatus 3 are coupled to each other via a communication path 4 such as a local area network (LAN).

The computing apparatus 2 is a computer (information processing apparatus) configured to execute software. The computing apparatus 2 may implement HPC.

The computing apparatus 2 may be equipped with a multicore processor including a plurality of arithmetic cores (processor cores), or may be a multiprocessor system equipped with a plurality of processors. The computing apparatus 2 may be a parallel computer system in which a plurality of computers are coupled.

The computing apparatus 2 executes software including a plurality of processing blocks. Each processing block may be referred to as a module. The software may be OSS. In the following, an example in which the computing apparatus 2 executes OSS is described.

The computing apparatus 2 may perform parallel processing in which a plurality of processes are carried out in parallel. In the computer system 1, the computing apparatus 2 is equipped with a plurality of processors, and has a function of parallel processing performed on a plurality of processes by using the plurality of processors.

The management apparatus 3 is configured to manage the computing apparatus 2, and implements performance optimization processing for software executed by the computing apparatus 2. Hereinafter, software to be subjected to performance optimization processing is referred to as optimization target software in some cases. In the present embodiment, an example in which the optimization target software is OSS will be described. The optimization target software includes a plurality of processing blocks.

The management apparatus 3 may perform optimization in processing block units. The optimization may be referred to as tuning. In the performance optimization processing, the management apparatus 3 enables an optimization target processing block output function in which an optimization target processing block to be subjected to the optimization processing is determined and presented from among these processing blocks.

Figure 2:
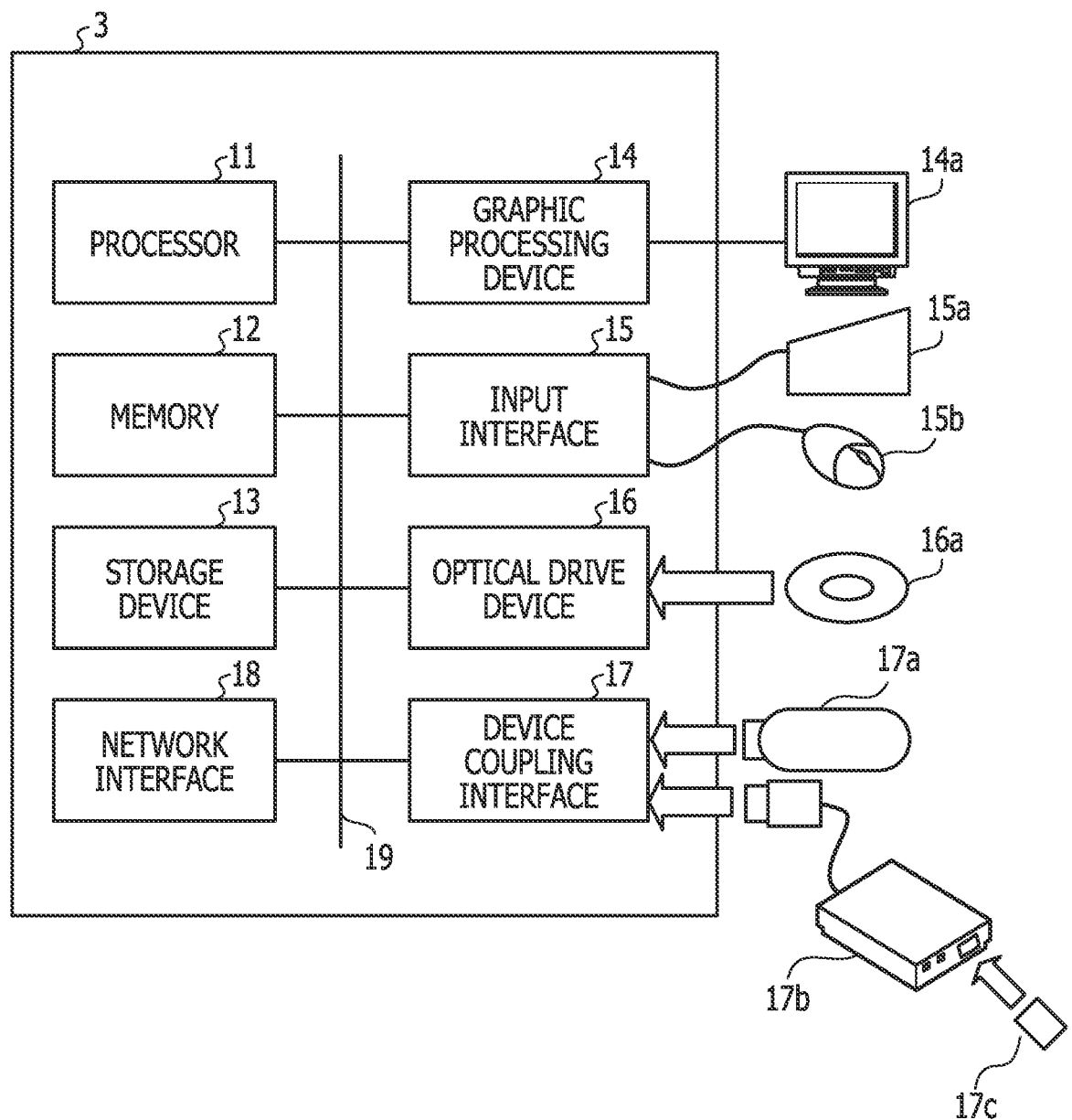
FIG. 2 is a diagram exemplifying a hardware configuration of a management apparatus of a computer system according to an embodiment.

FIG. 2 is a diagram exemplifying a hardware configuration of the management apparatus 3 of the computer system 1 according to the embodiment.

The management apparatus 3 is an information processing apparatus (computer) including, for example, a processor 11, a memory 12, a storage device 13, a graphic processing device 14, an input interface 15, an optical drive device 16, a device coupling interface 17, and a network interface 18, as constituent elements. These constituent elements 11 to 18 are configured so as to be mutually communicable via a bus 19.

The processor (processing unit) 11 controls the overall management apparatus 3. The processor 11 may be a multiprocessor. For example, the processor 11 may be any one of a central processing unit (CPU), a microprocessor unit (MPU), a digital signal processor (DSP), an application-specific integrated circuit (ASIC), a programmable logic device (PLD), and a field-programmable gate array (FPGA). The processor 11 may be a combination of two or more types of elements of the CPU, the MPU, the DSP, the ASIC, the PLD, and the FPGA.

Figure 3:
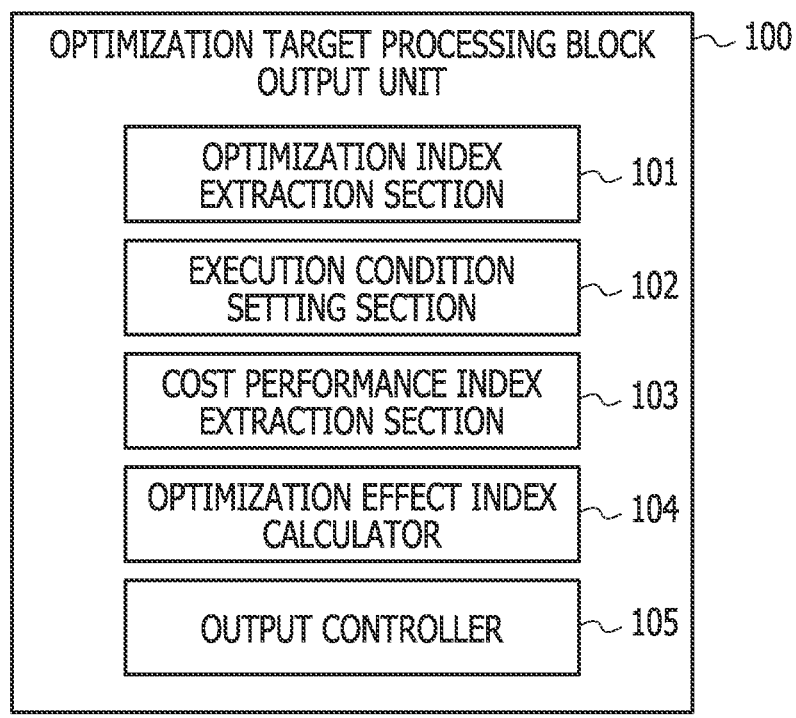
FIG. 3 is a diagram illustrating a functional configuration of an optimization target processing block output unit of a computer system according to an embodiment.

The processor 11 executes a control program (an optimization target processing block output program (not illustrated)), whereby a function as an optimization target processing block output unit 100 exemplified in FIG. 3 is enabled.

The management apparatus 3 enables a function as the optimization target processing block output unit 100 by executing programs (optimization target processing block output program, operating system (OS) program) recorded in a non-transitory computer-readable recording medium, for example.

Programs describing contents of processing to be executed by the management apparatus 3 may be recorded in various recording media. For example, programs to be executed by the management apparatus 3 may be stored in the storage device 13. The processor 11 loads at least part of the programs in the storage device 13 into the memory 12 and executes the loaded program.

The program to be executed by the management apparatus 3 (processor 11) may be recorded in a non-transitory portable recording medium, such as an optical disc 16a, a memory device 17a, or a memory card 17c. For example, the program stored in the portable recording medium may be executed after being installed in the storage device 13 by control from the processor 11. The processor 11 may read the program directly from the portable recording medium and execute the program.

The memory 12 is a storage memory including a read-only memory (ROM) and a random-access memory (RAM). The RAM of the memory 12 is used as a main storage device of the management apparatus 3. In the RAM, at least part of the programs to be executed by the processor 11 is temporarily stored. In the memory 12, various kinds of data desired for the processing by the processor 11 are stored.

The storage device 13 is a storage device, such as a hard disk drive (HDD), a solid-state drive (SSD), and a storage class memory (SCM), and stores various kinds of data. The storage device 13 is used as an auxiliary storage device of the management apparatus 3. In the storage device 13, the OS program, the control program, and various data are stored. The control program includes the optimization target processing block output program.

As the auxiliary storage device, a semiconductor storage device, such as the SCM and a flash memory, may be used. A plurality of the storage devices 13 may be used to constitute redundant arrays of inexpensive disks (RAID).

The storage device 13 may store various data generated when the optimization target processing block output unit 100 executes each processing.

A monitor 14a is coupled to the graphic processing device 14. The graphic processing device 14 displays an image on a screen of the monitor 14a in accordance with an instruction from the processor 11. Examples of the monitor 14a include a display device with a cathode ray tube (CRT), and a liquid crystal display device.

A keyboard 15a and a mouse 15b are coupled to the input interface 15. The input interface 15 transmits signals transmitted from the keyboard 15a and the mouse 15b to the processor 11. The mouse 15b is an example of a pointing device, and other pointing devices may be used. Examples of the other pointing devices include a touch panel, a tablet, a touch pad, and a track ball.

The optical drive device 16 reads data recorded on the optical disc 16a by using laser light or the like. The optical disc 16a is a portable non-transitory recording medium in which data is recorded so that the data is readable using light reflection. Examples of the optical disc 16a include a Digital Versatile Disc (DVD), a DVD-RAM, a compact disc read-only memory (CD-ROM), a compact disk-recordable (CD-R), and a compact disk-rewritable (CD-RW).

The device coupling interface 17 is a communication interface for coupling peripheral devices to the management apparatus 3. For example, the memory device 17a, a memory reader-writer 17b, and the like may be coupled to the device coupling interface 17. The memory device 17a is a non-transitory recording medium equipped with a function of communicating with the device coupling interface 17 and is, for example, a Universal Serial Bus (USB) memory. The memory reader-writer 17b writes data to the memory card 17c or reads data from the memory card 17c. The memory card 17c is a card-type non-transitory recording medium.

The network interface 18 is coupled to the communication path 4. The network interface 18 transmits and receives data to and from the computing apparatus 2 via the communication path 4. Other information processing apparatuses, communication devices, and the like may be coupled to the communication path 4.

FIG. 3 is a diagram illustrating a functional configuration of the optimization target processing block output unit 100 of the computer system 1 according to the embodiment.

The optimization target processing block output unit 100 detects a processing block expected to exhibit a high optimization effect under given input data, parallel conditions (execution conditions), and the like.

As illustrated in FIG. 3, the optimization target processing block output unit 100 includes functions as an optimization index extraction section 101, an execution condition setting section 102, a cost performance index extraction section 103, an optimization effect index calculator 104, and an output controller 105.

A compiler optimization report and a profiling report are input to the optimization target processing block output unit 100 from a compiler (not illustrated). The compiler may be executed in any of the computing apparatus 2 and the management apparatus 3, or may be executed in another information processing apparatus other than the computing apparatus 2 and the management apparatus 3.

The compiler optimization report is created by the compiler at the time of compiling the optimization target software, and indicates information on the optimization applied to the software, information on the optimization not applied thereto (for example, a reason for being non-applicable), and the like (for example, see FIGS. 8 to 10 described later). The compiler optimization report is a known report, and therefore a detailed description thereof will be omitted.

The profiling report is created by a profiler (performance analysis tool) attached to the compiler, and indicates various kinds of information collected by the profiler when the program is executed (see, for example, FIGS. 15 and 16 described later). The profiling report may include, for example, a frequency of function calls and an amount of time taken therefor. The profiling report is a known report, and therefore a detailed description thereof will be omitted.

The optimization index extraction section 101 may select, as an optimization target candidate, a processing block having a high cost from among a plurality of processing blocks constituting the optimization target software. For example, the optimization index extraction section 101 may determine, as an optimization target candidate, a processing block whose cost set by the profiler is equal to or higher than a predetermined threshold among the plurality of processing blocks constituting the optimization target software.

FIG. 4 is a diagram exemplifying a high-cost processing block ranking in the computer system 1 according to the embodiment.

In the following, an example is described in which OSS is taken as optimization target software, and Development Studio of FUJITSU LIMITED is used for the compiler and the profiler.

The high-cost processing block ranking exemplified in FIG. 4 is configured as a list in which a plurality of processing blocks included in the optimization target software are aligned in the order of cost, and is arranged in such a manner that the processing block having the highest cost value is set at the top.

The modules (processing blocks) ranked high in the high-cost processing block ranking exemplified in FIG. 4 are modules in a mathematical library code (FFT, MPI, or the like), and hard to be tuned on the optimization target software side, and therefore such modules are excluded from the targets of optimization performed by the management apparatus 3.

In the example illustrated in FIG. 4, two processing blocks (modules) of qvan2_ and func_11_ are selected as the optimization targets. The symbol "_" (underscore) at the end of qvan2_ and func_11_ represents an optional letter.

Each of these processing blocks may have a hierarchical structure including smaller processing blocks. For example, qvan2_ includes qvan2.1, qvan2.2, and qvan2.3 as processing blocks, and the processing block at the upper level of these processing blocks qvan2.1, qvan2.2, and qvan2.3 corresponds to qvan2.

Based on the compiler optimization report, the optimization index extraction section 101 creates difficulty information 201 for each optimization type, in which an optimization index value based on hardware specifications is set for each optimization type with respect to each of the plurality of processing blocks included in the optimization target software.

FIG. 5 is a diagram exemplifying the difficulty information 201 for each optimization type in the computer system 1 according to the embodiment.

The difficulty information 201 for each optimization type represents ease of implementation for each optimization non-applicable condition for each optimization type.

The optimization type is an optimization method applied to the processing blocks. In the example illustrated in FIG. 5, nine optimization types (optimization methods) of Opt-1 to Opt-9 are indicated. For example, Opt-6 refers to a software pipeline, and Opt-7 refers to implementation of single instruction multiple data (SIMD). Hereinafter, any optimization type (optimization method) may be expressed as Opt-n (n is a natural number).

The optimization types are not limited to the methods exemplified in FIG. 5, and methods other than the above-described methods may be used; the methods may be appropriately changed and carried oud.

The optimization non-applicable condition indicates a reason (condition) why the optimization type is not applicable. It may be said that the optimization non-applicable condition is a factor (optimization exclusion factor) that hinders the application of the optimization method when attempting to apply the optimization method to the processing block.

FIG. 6 is a diagram exemplifying the optimization non-applicable conditions in the computer system 1 according to the embodiment. In the example illustrated in FIG. 6, respective contents of six optimization non-applicable conditions of Nc-1 to Nc-6 are illustrated.

In the example illustrated in FIG. 6, for example, Nc-5 indicates that an execution statement unable to implement SIMD is included in a loop. Hereinafter, any non-applicable condition may be expressed as Nc-m (m is a natural number).

The difficulty information 201 for each optimization type exemplified in FIG. 5 is represented as a matrix in which the nine optimization types (optimization methods) of Opt-1 to Opt-9 and the six optimization non-applicable conditions (optimization exclusion factors) of Nc_1 to Nc_6 are combined. In the matrix, a numerical value indicating ease of application of optimization is set for each combination. Hereinafter, the numerical value (index value) indicating the ease of application of the optimization may be referred to as an optimization index value in some cases.

In the example illustrated in FIG. 5, any numerical value equal to or greater than 0 and less than 1 is set as the optimization index value, where a smaller value indicates that the optimization is more difficult to be applied, and a larger value indicates that the optimization is easier to be applied. The optimization index value may be referred to as a non-applicable condition indicating application difficulty of the optimization. In the difficulty information 201 for each optimization type, a value indicating ease of implementation when the optimization method is applied to the source code of the optimization target software is set for each non-applicable condition.

For example, in the example illustrated in FIG. 5, for Opt-7 (SIMD implementation), the optimization index value 0.8 is set with respect to Nc-3 (branch (presence of an IF-statement)). This indicates that, in a case where the implementation of SIMD is carried out as optimization processing for a processing block of the optimization target software, application of the optimization is relatively easy from a viewpoint of branching. For Opt-7 (SIMD implementation), the optimization index value 0.4 is set with respect to Nc-6 (there is a possibility that a result differs from a serial execution result due to data dependency, a change in substitution reference order, or the like). This indicates that it is relatively difficult to carry out the implementation of SIMD as optimization processing for the processing block of the optimization target software because of high data dependency. Note that the optimization index value 0 also includes a case where the optimization method has already been applied.

As described above, the difficulty information 201 for each optimization type is configured to define the optimization index values indicating the difficulty of implementation for each combination of the optimization type and the non-applicable condition. The difficulty information 201 for each optimization type may be referred to as an optimization index table.

It is desirable for the difficulty information 201 for each optimization type to be set in advance by a programmer or the like based on an empirical rule. For example, for each of the optimization types, the programmer or the like specifies an optimization non-applicable condition (optimization exclusion factor) expected to be a factor that may hinder the application of the optimization type, and sets the degree of influence (application easiness, application difficulty) thereof as the optimization index value.

Hardware specifications are reflected in the optimization index values. For example, the hardware specifications are reflected in the optimization types and the optimization non-applicable conditions.

For example, regarding the optimization types, in a case where an SIMD circuit is mounted as a hardware specification in the optimization environment, the implementation of SIMD is cited as a candidate for an optimization type. The hardware specification of the SIMD circuit is also reflected in the SIMD length (the number of instructions executable at the same time). Regarding the optimization non-applicable conditions, for example, the number of registers as a hardware specification is reflected in register shortage.

The difficulty information 201 for each optimization type is stored, for example, in a predetermined storage area of the memory 12 or the storage device 13.

The optimization index extraction section 101 sets optimization index information 202 for each processing block.

Figure 7:
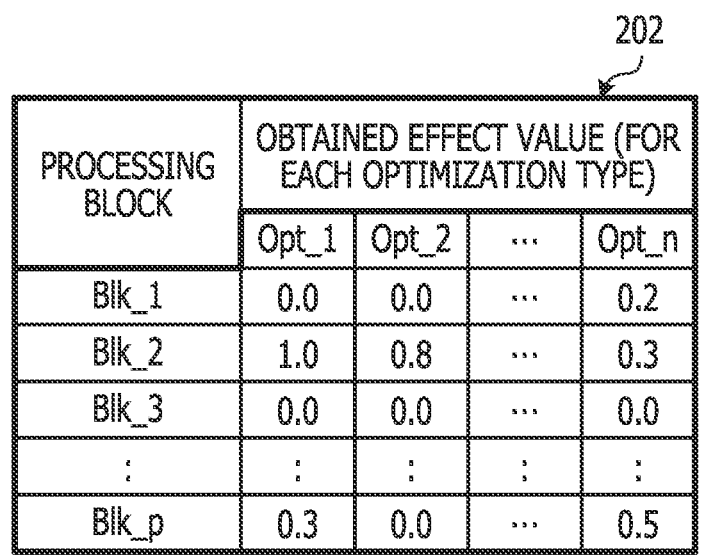
FIG. 7 is a diagram exemplifying optimization index information for each processing block in a computer system according to an embodiment.

FIG. 7 is a diagram exemplifying the optimization index information 202 for each processing block in the computer system 1 according to the embodiment.

The optimization index information 202 for each processing block exemplified in FIG. 7 is represented as a matrix in which p types (p is a natural number) of processing blocks Blk_1 to Blk_p and n optimization types (optimization methods) of Opt-1 to Opt-n are combined. An optimization index value extracted from the difficulty information 201 for each optimization type is set at a position corresponding to each combination of the processing block and the optimization type in the matrix.

The optimization index extraction section 101 extracts the optimization types and the non-applicable conditions from the compiler optimization report of each of the processing blocks. Based on the combinations of these optimization types and non-applicable conditions, the optimization index extraction section 101 extracts the optimization index value corresponding to the combination of the optimization type and the non-applicable condition with reference to the difficulty information 201 for each optimization type.

In the optimization index information 202 for each processing block, the optimization index extraction section 101 sets the optimization index value extracted from the difficulty information 201 for each optimization type to the combination portion of the corresponding processing block and optimization type.

Figure 8:
FIG. 8 is a diagram in which part of a compiler optimization report is extracted and exemplified in a computer system according to an embodiment.
Figure 9:
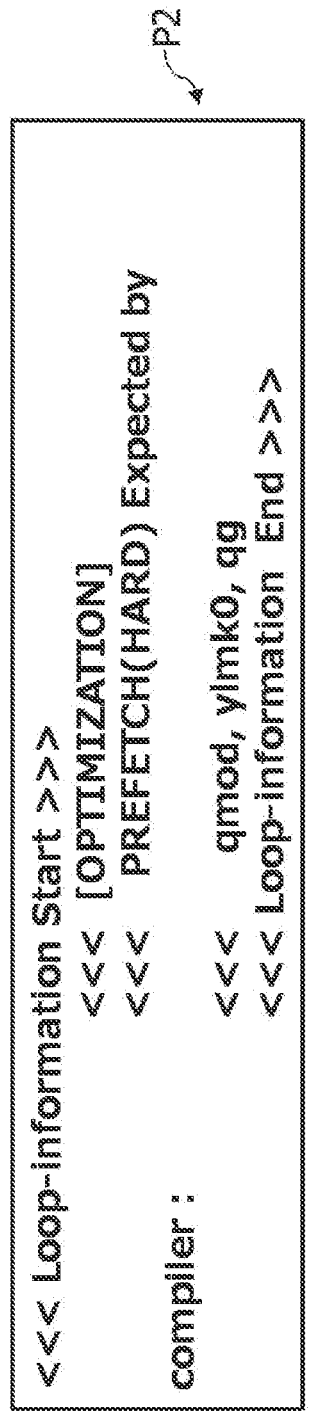
FIG. 9 is a diagram in which part of a compiler optimization report is extracted and exemplified in a computer system according to an embodiment.

FIGS. 8 to 10 are diagrams in which part of the compiler optimization report is extracted and exemplified in the computer system 1 according to the embodiment.

The compiler optimization report, part of which is exemplified in FIGS. 8 to 10, is created by the compiler for the processing block qvan2_ (see FIG. 4) and includes information (optimization application condition) indicating an optimization application state (see a symbol P1 in FIG. 8 and a symbol P2 in FIG. 9). The compiler optimization report also includes information (optimization non-applicable condition) indicating that the optimization method has not been applied (see a symbol P3 in FIG. 10).

For example, information indicating an optimization application state, an optimization non-applicable condition, and the like may be extracted from the compiler optimization report by searching for a predetermined word such as "[OPTIMIZATION]" included in the compiler optimization report.

The optimization index extraction section 101 may extract information corresponding to the optimization type and the non-applicable condition from the information indicating the optimization application state, the optimization non-applicable condition, and the like of the compiler optimization report.

FIG. 11 is a diagram for describing the difficulty information 201 for each optimization type in the computer system 1 according to the embodiment, and FIG. 12 is a diagram illustrating an example of the optimization index information 202 for each processing block thereof. FIG. 12 illustrates the optimization index information 202 for each processing block corresponding to the processing blocks qvan2.1, qvan2.2, and qvan2.3.

For example, qvan2.2 includes combinations of the optimization types Opt-6 and Opt-7, and Nc_3. As illustrated in FIG. 11, the optimization index extraction section 101 extracts each of the optimization index values 0.8 of the non-applicable condition Nc-3 corresponding to the optimization types Opt-6 and Opt-7 in the difficulty information 201 for each optimization type. Then, as illustrated in FIG. 12, the optimization index extraction section 101 sets the extracted optimization index value 0.8 to be associated with the optimization types Opt-6 and Opt-7 of qvan2.2 in the optimization index information 202 for each processing block.

Combinations of the optimization types Opt-6 and Opt-7, and Nc_6 are included in qvan2.3. As illustrated in FIG. 11, the optimization index extraction section 101 extracts each of the optimization index values 0.4 of the non-applicable condition Nc-6 corresponding to the optimization types Opt-6 and Opt-7 in the difficulty information 201 for each optimization type. Then, as illustrated in FIG. 12, the optimization index extraction section 101 sets the extracted optimization index value 0.4 to be associated with the optimization types Opt-6 and Opt-7 of qvan2.3 in the optimization index information 202 for each processing block.

In qvan2.1, all of the optimization types applicable in the processing block have already been applied, and thus the optimization index value 0 is extracted. Then, as illustrated in FIG. 12, the optimization index extraction section 101 sets the extracted optimization index value 0 to be associated with the optimization types Opt-1 to Opt-9 of qvan2.1 in the optimization index information 202 for each processing block.

The optimization index extraction section 101 stores the created optimization index information 202 for each processing block in a predetermined storage area of the memory 12, the storage device 13, or the like.

The execution condition setting section 102 creates execution condition information 203.

The execution condition information 203 is information indicating conditions (execution conditions) when the computing apparatus 2 executes the optimization target software.

Figure 13:
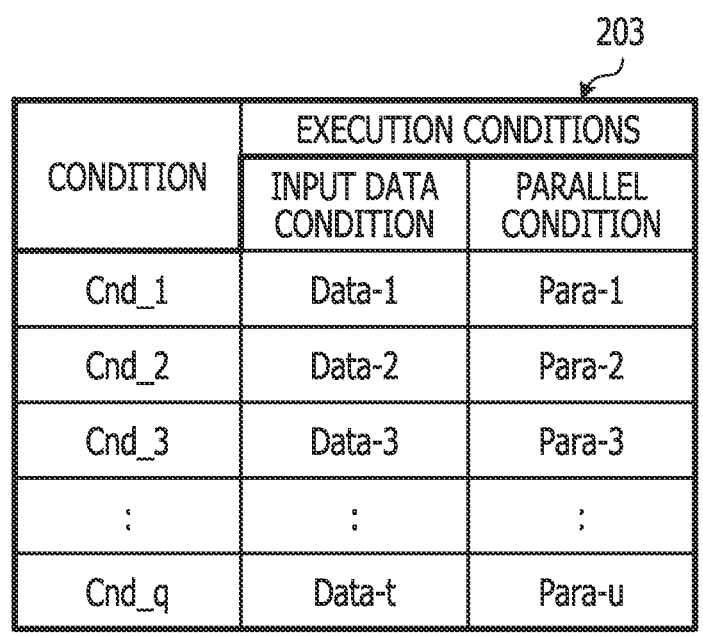
FIG. 13 is a diagram exemplifying execution condition information in a computer system according to an embodiment.

FIG. 13 is a diagram exemplifying the execution condition information 203 in the computer system 1 according to the embodiment.

In the execution condition information 203 exemplified in FIG. 13, the execution conditions are each configured as a combination of an input data condition and a parallel condition. As information for identifying each combination of the input data condition and the parallel condition, Cnd_1 to Cnd_q (q is a natural number) are set. These Cnd_1 to Cnd_q may be expressed as conditions Cnd_1 to Cnd_q.

The input data condition is a condition for data that is input to the optimization target software. For example, in the case where the optimization target software is a simulator, the input data condition may be a standard, a condition, or the like related to data to be input to the simulator. The execution condition setting section 102 may set the input data condition by randomly sampling any points from an assumed input data variation range.

The parallel data condition is a condition for executing parallel computing using a plurality of processors included in the computing apparatus 2, and is, for example, information such as the number of processors used for the parallel computing. The execution condition setting section 102 may set a parallel data condition by randomly sampling any points from an assumed parallel condition variation range.

The cost performance index extraction section 103 creates processing block cost information 204 based on a profiling report output from the profiler.

The profiler performs profiling on a processing block of the optimization target software for each execution condition set by the execution condition setting section 102, so as to create the profiling report.

The cost performance index extraction section 103 extracts a cost or a performance index of each processing block from the profiling report for each execution condition created by the profiler.

The cost is, for example, CPU time, elapsed time, or power. The performance index is a value indicating performance, and is, for example, a value of instructions per cycle (IPC), a memory bandwidth, floating point operations per second (FLOPS), an SIMD ratio, or an average number of clocks; the performance index may be an index depending on a hardware environment.

Hereinafter, at least one of the cost and the performance index may be expressed as a cost/performance index.

Figure 14:
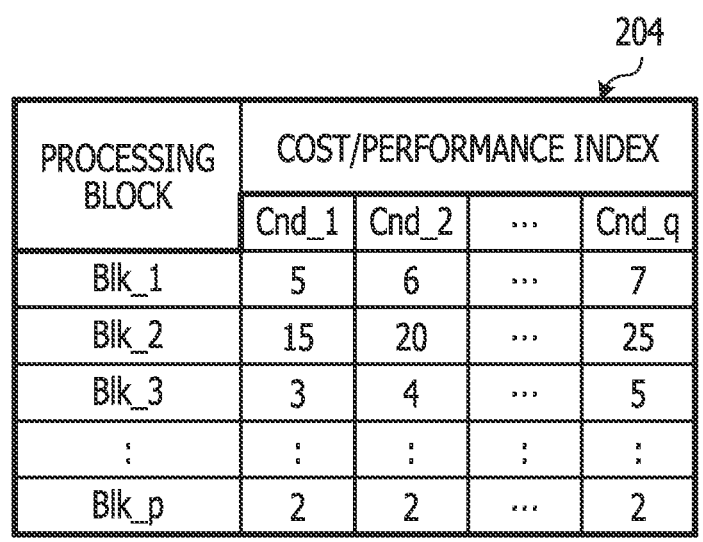
FIG. 14 is a diagram exemplifying processing block cost information in a computer system according to an embodiment.

FIG. 14 is a diagram exemplifying the processing block cost information 204 in the computer system 1 according to the embodiment.

In the processing block cost information 204 exemplified in FIG. 14, a cost or a performance index (cost/performance index) for each of the conditions (Cnd_1 to Cnd_q) is associated with the processing blocks (Blk_1 to Blk_p).

Information configuring the processing block cost information 204 is stored in a predetermined storage area of the memory 12, the storage device 13, or the like.

The cost performance index extraction section 103 statistically processes the costs of all the execution conditions for each processing block to calculate a representative cost. The cost performance index extraction section 103 statistically processes the performance indices of all the execution conditions for each processing block to calculate a representative performance index. The statistical processing may be, for example, calculation of an average value or calculation of a median. At least one of the representative cost and the representative performance index may be expressed as a representative cost/performance index. The representative cost/performance index may be simply referred to as a representative cost.

The cost performance index extraction section 103 stores the calculated costs, performance indices, representative cost, representative performance index, and the like in a predetermined storage area of the memory 12, the storage device 13, or the like.

FIGS. 15 and 16 are diagrams, in each of which part of a profiling report is extracted and exemplified in the computer system 1 according to the embodiment.

FIGS. 15 and 16 illustrate part of a train of profiling reports created by the profiler for the processing block qvan2_ (see FIG. 4).

The profiling reports exemplified in FIGS. 15 and 16 include cost information of the processing blocks qvan2.1 to 2.3 (see symbols P01 and P02 in FIG. 15, and a symbol P03 in FIG. 16).

FIG. 17 is a diagram for describing cost totalization information of the processing blocks in the computer system 1 according to the embodiment. The cost totalization information exemplified in FIG. 17 indicates the cost, cost ratio, and execution time for each of the processing blocks qvan2.1 to 2.3 included in the processing block qvan2_. The cost performance index extraction section 103 may calculate these values for each processing block by using the values extracted from the profiling report.

The cost performance index extraction section 103 may acquire the value of each cost of qvan2.1 to qvan2.3 extracted from the profiling report, and perform totaling or the like as requested to register the value in the processing block cost information 204.

The cost performance index extraction section 103 may register the value of each cost ratio, the value of each execution time, and the like of qvan2.1 to qvan2.3 extracted from the profiling report, in the processing block cost information 204, the cost totalization information of the processing blocks, and the like.

The optimization effect index calculator 104 calculates an optimization effect index of each processing block. The optimization effect index is a value representing an effect of optimization performed on a processing block. The optimization effect index indicates whether the processing block is effectively optimized.

The optimization effect index calculator 104 calculates the optimization effect index of each processing block based on the optimization index value of the processing block calculated by the optimization index extraction section 101 and an application effect weight for each optimization type. The optimization effect index calculator 104 calculates the optimization effect index based on Equation (1) given below.

$$\text{Optimization effect index} = \Sigma(\text{optimization index value} \times \text{application effect weight}) \quad (1)$$

In the present embodiment, an example in which the optimization effect index has a value of equal to 1 or less will be described.

The application effect weight is set in advance for each optimization type. The total sum of the application effect weights of the respective optimization types is 1.0 ($\Sigma$(application effect weight of each optimization type)=1.0).

FIG. 18 is a diagram exemplifying the application effect weight of each optimization type in the computer system 1 according to the embodiment.

For example, to optimize the performance of the A64FX processor environment, SIMD implementation and a software pipeline are important. Thus, in the example illustrated in FIG. 18, an application effect weight of 0.45 is set for "Opt-6: software pipeline", and an application effect weight of 0.55 is set for "Opt-7: SIMD implementation". It is assumed that other optimization schemes have already been applied in the Asis source code by the compiler.

As described above, for example, it is desirable to set the application effect weight in advance for at least one optimization type considered to be important for performance optimization by an operator.

The optimization effect index calculator 104 stores the calculated optimization effect indices in a predetermined storage area of the memory 12, the storage device 13, or the like.

Based on the optimization effect indices calculated by the optimization effect index calculator 104, the output controller 105 selects at least one processing block (optimization target processing block) that may effectively achieve optimization from among the plurality of processing blocks included in the optimization target software. Subsequently, the output controller 105 outputs information on the selected optimization target processing block as presentation information. The optimization target processing block may be called a processing block recommended as an optimization target candidate.

The output controller 105 extracts processing blocks (optimization target processing blocks) in which the value of the optimization effect index is equal to or greater than a threshold from among the plurality of processing blocks included in the optimization target software.

The output controller 105 creates optimization target processing block presentation information 205 including these optimization target processing blocks.

FIG. 19 is a diagram exemplifying the optimization target processing block presentation information 205 in the computer system 1 according to the embodiment.

The optimization target processing block presentation information 205 exemplified in FIG. 19 is configured as a list in which a plurality of processing blocks constituting a plurality of pieces of optimization target software are aligned in accordance with optimization effect index values, and are arranged such that the processing block having the highest optimization effect index value is set at the top.

The optimization target processing block presentation information 205 exemplified in FIG. 19 includes a representative cost, an optimization effect index, and an optimization index value (for each optimization type) corresponding to each processing block.

In FIG. 19, the optimization effect index of each processing block is calculated by the above-described Equation (1) using each of a plurality of optimization index values regarding the same processing block indicated on the right side of the optimization effect index in the drawing.

The output controller 105 acquires the representative cost/performance index (representative cost) for each processing block calculated by the cost performance index extraction section 103, and sets the acquired information to be associated with the corresponding processing block in the optimization target processing block presentation information 205.

The output controller 105 acquires the optimization effect index of the processing block calculated by the optimization effect index calculator 104, and sets the acquired information to be associated with the corresponding processing block in the optimization target processing block presentation information 205.

The output controller 105 acquires information on the optimization index value corresponding to the processing block by referring to the optimization index information 202 for each processing block, and sets the acquired information to be associated with the corresponding processing block in the optimization target processing block presentation information 205.

It is desirable for the output controller 105 to extract only a processing block whose optimization effect index is equal to or greater than a predetermined threshold (for example, 0.5), and present the extracted processing block in the optimization target processing block presentation information 205.

By referring to the optimization target processing block presentation information 205 and selecting a processing block having a high optimization effect index value as a processing block of optimization target (optimization target processing block), the operator may determine a processing block having a high optimization effect.

By referring to the optimization target processing block presentation information 205 and selecting a processing block having a high representative cost value (high-cost processing block), the operator may determine a cost-efficient processing block as an optimization target processing block. The expression "cost is high" indicates that the ratio of the cost of the processing block to the total cost is high.

As a criterion for selecting an optimization target processing block, any one of the optimization effect index and the representative cost (cost) may be preferentially adopted. For example, among the plurality of processing blocks, a processing block having a high optimization effect index may be preferentially selected therefrom, and when there are processing blocks having the same optimization effect index, a processing block having a high representative cost may be preferentially selected from among these processing blocks. Among the plurality of processing blocks, a processing block having a high representative cost may be preferentially selected therefrom, and when there are processing blocks having the same representative cost, a processing block having a high optimization effect index may be preferentially selected from among these processing blocks.

The operator may refer to the optimization target processing block presentation information 205, refer to the optimization index values, and select an optimization type (optimization method) having a high optimization index value, thereby making it possible to determine the optimization type (optimization method) able to apply the optimization method to the processing block.

In the example illustrated in FIG. 19, the optimization index value is set to be associated with the processing block in the optimization target processing block presentation information 205, but the optimization target processing block presentation information 205 is not limited thereto, and may be appropriately changed.

FIG. 20 is a diagram illustrating a modification example of the optimization target processing block presentation information 205 in the computer system 1 according to the embodiment.

In the example illustrated in FIG. 20, a source code change content for each optimization type is provided instead of the optimization index value for each optimization type in the optimization target processing block presentation information 205 exemplified in FIG. 19.

The source code change content is information indicating a specific change content to be carried out on the source code in order to implement the optimization type, and may be, for example, information that suggests division of a loop, integration of loops, or the like.

For example, information usable as the source code change content may be registered being associated with each optimization type in a database or the like, and the output controller 105 may extract the above information from the database to use it.

By referring to the optimization target processing block presentation information 205 and referring to the configuration content before the source code change for each optimization type, the operator may recognize the content of the change to be carried out on the source code so as to implement the optimization type (optimization method), which is highly convenient.

FIG. 21 is a diagram exemplifying the optimization target processing block presentation information 205 in the computer system 1 according to the embodiment.

In the example illustrated in FIG. 21, the optimization target processing block presentation information 205 regarding the processing blocks qvan2.1 to 2.3 is indicated, and an example is given in which a processing block whose optimization effect index is greater than or equal to a threshold (0.5 in this example) is detected as the optimization target.

In the optimization target processing block presentation information 205 exemplified in FIG. 21, the value of the optimization effect index of qvan2.2 and the value of the cost of qvan2.2 are respectively highest. Therefore, the operator may determine the above-mentioned qvan2.2 as the optimization target. With reference to the optimization target processing block presentation information 205, the output controller 105 may present, to the operator or the like, the processing block having the highest optimization effect index value and the highest cost value as the optimization target processing block.

(B) Operation

Figure 22:
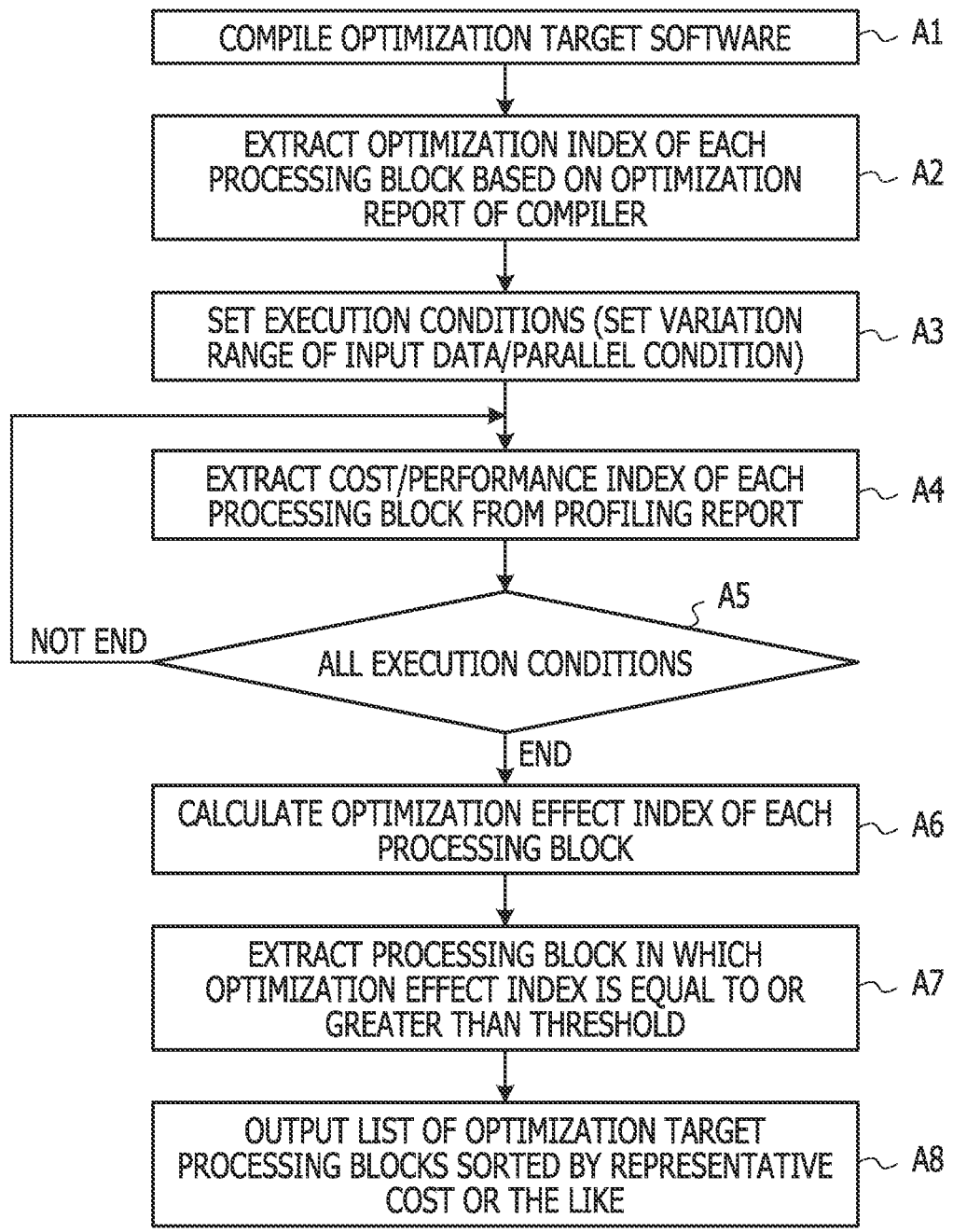
FIG. 22 is a flowchart for describing an optimization target processing block output method performed by a computer system according to an embodiment.

An optimization target processing block output method performed by the computer system 1 configured in the manner described above according to the embodiment, will be described with reference to a flowchart illustrated in FIG. 22 (steps A1 to A8).

In step A1, a compiler compiles optimization target software. The compiler creates a compiler optimization report. A profiler creates a profiling report.

In step A2, based on the compiler optimization report, the optimization index extraction section 101 extracts optimization index values based on hardware specifications from the difficulty information 201 for each optimization type for each of a plurality of processing blocks included in the optimization target software, and creates the optimization index information 202 for each processing block.

In step A3, the execution condition setting section 102 sets execution conditions to create the execution condition information 203. For example, the execution condition setting section 102 sets a variation range of each of an input data condition and a parallel condition.

In step A4, the cost performance index extraction section 103 extracts a cost/performance index of each processing block from the profiling report for each execution condition created by the profiler.

In step A5, the cost performance index extraction section 103 checks whether the cost/performance index of each processing block has been extracted for all the execution conditions. When the extraction of the cost/performance index of each processing block for all the execution conditions has not ended yet ("not end" route in step A5) as a check result, the flow returns to step A4.

In contrast, when the extraction of the cost/performance index of each processing block for all the execution conditions has ended ("end" route in step A5), the flow goes to step A6.

In step A6, the optimization effect index calculator 104 calculates an optimization effect index of each processing block.

In step A7, the output controller 105 extracts processing blocks (optimization target processing blocks) in which the value of the optimization effect index is equal to or greater than a threshold from among the plurality of processing blocks included in the optimization target software.

In step A8, the output controller 105 outputs, as the optimization target processing block presentation information 205, a list of the optimization target processing blocks sorted by the representative cost or the representative performance index. After that, the processing ends.

(C) Effects

As described above, in the computer system 1 according to the embodiment, based on the compiler optimization report, the optimization index extraction section 101 extracts optimization index values based on the hardware specifications from the difficulty information 201 for each optimization type for each of the plurality of processing blocks included in the optimization target software, and creates the optimization index information 202 for each processing block.

The optimization effect index calculator 104 calculates the optimization effect index of each processing block based on the above-described Equation (1). The optimization effect index indicates whether the processing block is effectively optimized.

Then, the output controller 105 extracts the processing blocks (optimization target processing blocks) in which the value of the optimization effect index is equal to or greater than the threshold from among the plurality of processing blocks included in the optimization target software, and creates the optimization target processing block presentation information 205, which lists and presents these optimization target processing blocks in accordance with the optimization effect index values.

By referring to the optimization target processing block presentation information 205, the operator may search, at high speed, for the optimization target processing block able to obtain an effect by the optimization.

The cost performance index extraction section 103 extracts the cost/performance index of each processing block from the profiling report for each execution condition created by the profiler, and statistically processes the cost/performance indices of all the execution conditions for each processing block to calculate the representative cost/performance index.

The output controller 105 sets the representative cost/performance index calculated in this manner to be associated with the processing block in the optimization target processing block presentation information 205.

By referring to the optimization target processing block presentation information 205 and selecting a processing block having a high representative cost value, the operator may determine a cost-efficient processing block as the optimization target processing block. By referring to the optimization target processing block presentation information 205 and selecting a processing block having a high representative performance index value, the operator may determine a processing block able to achieve high performance (for example, the processing time is short) as the optimization target processing block.

According to the computer system 1 according to the embodiment, by using the compiler optimization report created at the time of compiling the optimization target software and the profiling report created at the time of executing the compiler-attached profiler, it is possible to detect, at high speed, an optimization target processing block having a high optimization effect based on the hardware specifications under the execution conditions.

FIG. 23 is a diagram illustrating an optimization result detected by the management apparatus 3 of the computer system 1 according to the embodiment, along with source code analysis results by an expert using existing methods.

FIG. 23 illustrates an example in which the processing block qvan2.2 is optimized; for example, item number 0 indicates the current state (Asis), and indicates a result of optimization using an optimization option of "−Kfast".

Item numbers 1 to 5 indicate results of optimization respectively performed by the methods determined by an expert, and it is understood that the elapsed time is shortened and the speed is increased in the result of item numbers 2 to 5 as compared with the result of item number 0. Among the item numbers 2 to 5, the result of item number 5 achieves the highest speed.

A result of optimization detected by the management apparatus 3 of the computer system 1 according to the embodiment is equal to the result of item number 3, and is comparable to the result of item number 5 having achieved the highest speed.

As described above, with the computer system 1 according to the embodiment, it is possible to achieve high performance equivalent to that achieved by performance optimization by an expert.

(D) Others

Each configuration and each processing of the present embodiment may be selected as desired, or may be combined as appropriate.

The techniques disclosed herein are not limited to the above-described embodiment, and may be implemented by making various modifications thereto without departing from the gist of the embodiment.

For example, in the above-described embodiment, the optimization effect index calculator 104 calculates the optimization effect index by using Equation (1), and the cost performance index extraction section 103 performs statistical processing on the cost/performance indices of all the execution conditions for each processing block, thereby calculating the representative cost/performance index, but the embodiment is not limited thereto.

For example, the optimization effect index calculator 104 may calculate the optimization effect index reflecting the cost of the processing block.

For example, the optimization effect index calculator 104 may calculate the optimization effect index based on Equation (2) given below.

$$\text{Optimization effect index} = \Sigma(\text{optimization index value} \times \text{application effect weight}) \times \text{processing block cost index} \quad (2)$$

The processing block cost index is, for example, the elapsed time or the number of clocks of the processing block. The application effect weight is set in advance for each optimization type. The total sum of the application effect weights of the respective optimization types is 1.0 (Σ(application effect weight of each optimization type)=1.0).

Since the cost is reflected in the optimization effect index, by selecting a processing block having a high optimization effect index value as the optimization target processing block, it is possible to efficiently determine a processing block having a high optimization effect and a high cost.

At least part of the function as the management apparatus 3 may be included in the computing apparatus 2, and may be appropriately changed and implemented.

In the above-described embodiment, the example in which the optimization target software is OSS is described, but the embodiment is not limited thereto; software other than the OSS may be set as the optimization target software, and may be various modified and implemented.

The above-described disclosure enables a person skilled in the art to implement and manufacture the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:
    extracting an optimization method and an optimization non-applicable condition indicating a reason why the optimization method is not applicable, from an optimization report created at a time of compiling software;
    determining an index value of optimization application easiness for each of a plurality of processing blocks included in the software, based on the optimization method and the optimization non-applicable condition;
    determining an optimization target processing block to be optimized among the plurality of processing blocks included in the software, based on the index value;
    selecting an optimization method having the index value highest among predefined optimization methods with respect to the determined optimization target processing block; and
    tuning the software by applying the selected optimization method to a source code of the determined optimization target processing block.

2. The non-transitory computer-readable recording medium according to claim 1, the process further comprising:
    calculating the index value based on implementation easiness corresponding to the optimization method and the optimization non-applicable condition, the implementation easiness being extracted from difficulty information for each optimization type in which implementation easiness for each of a plurality of types of non-applicable conditions is defined for each of a plurality of types of optimization methods.

3. The non-transitory computer-readable recording medium according to claim 1, the process further comprising:
    determining a plurality of processing blocks each having an index value equal to or larger than a predetermined threshold as optimization target processing blocks, among the plurality of processing blocks included in the software; and
    outputting, in a list form, the plurality of processing blocks determined as the optimization target processing blocks along with the index value.

4. The non-transitory computer-readable recording medium according to claim 1, the process further comprising:
    extracting cost information of the plurality of processing blocks from a profiling report created under a plurality of types of execution conditions for the software;
    calculating a representative cost of each of the plurality of processing blocks based on each cost information obtained under the plurality of types of execution conditions; and
    preferentially determining, based on the representative cost, a processing block having a high representative cost as the optimization target processing block to be optimized among the plurality of processing blocks included in the software.

5. A method of determining a processing block to be optimized, the method comprising:
    extracting, by a computer, an optimization method and an optimization non-applicable condition indicating a reason why the optimization method is not applicable, from an optimization report created at a time of compiling software;
    determining an index value of optimization application easiness for each of a plurality of processing blocks included in the software, based on the optimization method and the optimization non-applicable condition;
    determining an optimization target processing block to be optimized among the plurality of processing blocks included in the software, based on the index values;
    selecting an optimization method having the index value highest among predefined optimization methods with respect to the determined optimization target processing block; and
    tuning the software by applying the selected optimization method to a source code of the determined optimization target processing block.

6. The method according to claim 5, further comprising:
    calculating the index value based on implementation easiness corresponding to the optimization method and the optimization non-applicable condition, the implementation easiness being extracted from difficulty information for each optimization type in which implementation easiness for each of a plurality of types of non-applicable conditions is defined for each of a plurality of types of optimization methods.

7. The method according to claim 5, further comprising:
    determining a plurality of processing blocks each having an index value equal to or larger than a predetermined threshold as optimization target processing blocks, among the plurality of processing blocks included in the software; and
    outputting, in a list form, the plurality of processing blocks determined as the optimization target processing blocks along with the index value.

8. The method according to claim 5, further comprising:
    extracting cost information of the plurality of processing blocks from a profiling report created under a plurality of types of execution conditions for the software;

calculating a representative cost of each of the plurality of processing blocks based on each cost information obtained under the plurality of types of execution conditions; and preferentially determining, based on the representative cost, a processing block having a high representative cost as the optimization target processing block to be optimized among the plurality of processing blocks included in the software.

9. An information processing apparatus, comprising:
a memory; and
a processor coupled to the memory and the processor configured to:
extract an optimization method and an optimization non-applicable condition indicating a reason why the optimization method is not applicable, from an optimization report created at a time of compiling software;
determine an index value of optimization application easiness for each of a plurality of processing blocks included in the software, based on the optimization method and the optimization non-applicable condition;
determine an optimization target processing block to be optimized among the plurality of processing blocks included in the software, based on the index value;
select an optimization method having the index value highest among predefined optimization methods with respect to the determined optimization target processing block; and
tune the software by applying the selected optimization method to a source code of the determined optimization target processing block.

10. The information processing apparatus according to claim 9, wherein the processor is further configured to:
calculate the index value based on implementation easiness corresponding to the optimization method and the optimization non-applicable condition, the implementation easiness being extracted from difficulty information for each optimization type in which implementation easiness for each of a plurality of types of non-applicable conditions is defined for each of a plurality of types of optimization methods.

11. The information processing apparatus according to claim 9, wherein the processor is further configured to:
determine a plurality of processing blocks each having an index value equal to or larger than a predetermined threshold as optimization target processing blocks, among the plurality of processing blocks included in the software; and
output, in a list form, the plurality of processing blocks determined as the optimization target processing blocks along with the index value.

12. The information processing apparatus according to claim 9, wherein the processor is further configured to:
extract cost information of the plurality of processing blocks from a profiling report created under a plurality of types of execution conditions for the software;
calculate a representative cost of each of the plurality of processing blocks based on each cost information obtained under the plurality of types of execution conditions; and
preferentially determine, based on the representative cost, a processing block having a high representative cost as the optimization target processing block to be optimized among the plurality of processing blocks included in the software.

* * * * *